United States Patent Office 2,812,350
Patented Nov. 5, 1957

2,812,350

(5,5,7,7-TETRAMETHYL-2-OCTENYL)TRIALKYL AMMONIUM SALTS

Warren D. Niederhauser, Huntsville, Ala., assignor to Rohm & Haas Company, Philadelphia, Pa., a corporation of Delaware No Drawing. Application August 29, 1955,
Serial No. 531,277

5 Claims. (Cl. 260—501)

This invention is concerned with quaternary ammonium salts of the structure of Formula I:

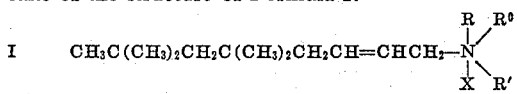

I  $CH_3C(CH_3)_2CH_2C(CH_3)_2CH_2CH=CHCH_2-N\begin{matrix}R\\R^0\\R'\end{matrix}\ X$ where R, R⁰, and R', when not connected directly to each other, are each selected individually from the group consisting of methyl, ethyl, and β-hydroxyethyl, R and R⁰, when directly connected together are selected from the group consisting of —CH₂CH₂OCH₂CH₂—, —CH₂CH₂SCH₂CH₂—, —(CH₂)₄— and —(CH₂)₅—, and X is an anion.

Examples of the anions include chloride, bromide, sulfate, acetate, lactate, tartrate, citrate, phosphate, glycinate, and hydroxyl Various methods may be employed for producing the quaternary ammonium salts. They may be produced by the reaction of a dodecenyl halide having the Formula II:

II   $CH_3C(CH_3)_2CH_2C(CH_3)_2CH_2CH=CHCH_2Y$ where Y is selected from the group consisting of chlorine and bromine, with a tertiary amine of the general Formula III:

III   $R'N\begin{matrix}R\\R^0\end{matrix}$

The compounds of Formula II are disclosed in my Patent No. 2,689,873. The tertiary amines that may be reacted therewith include trimethylamine; triethylamine; triethanolamine; N-methyl-morpholine; N-methyl-piperidine; N-methyl-pyrrolidine; N-methyl-thiamorpholine; and also the N-ethyl- or N-hydroxyethyl-morpholine, -piperidine, -pyrrolidine, or -thiamorpholine.

This reaction may be effected in solution, such as in lower alcohols including ethanol, methanol, isopropanol, as well as other solvents including acetonitrile. Reaction may be effected at reflux. The product may be isolated or recovered by extraction of excess amine, such as with a hydrocarbon solvent, e. g. heptane, and subsequent evaporation of residual solvent.

An alternative procedure is to react a compound of Formula II above with a secondary amine of Formula IV:

IV   $HN\begin{matrix}R^0\\R\end{matrix}$

Examples of these amines include dimethylamine; diethylamine, morpholine, thiamorpholine, piperidine and pyrrolidine. The reaction of the compounds of Formulas II and IV produces a tertiary amine as disclosed in my Patent, No. 2,706,195, and the resulting tertiary amine is then alkylated such as with an alkyl halide of Formula V:

V   R'Y or with ethylene oxide. Methyl and ethyl chlorides are examples of the alkyl halides that may be used. The quaternization of the tertiary amine obtained by the reaction of a compound of Formula II with a compound of Formula IV may be effected in suitable solvent, such as lower alcohols including ethanol, methanol, and isopropanol, heated to reflux. Reaction may be effected under pressure, particularly when the alkylating agent is gaseous at normal conditions of temperature and pressure, such as ethylene oxide or methyl chloride. The conventional conditions of temperature and pressure may be employed for this alkylating reaction.

The quaternary ammonium compounds of Formula I thereby obtained are fungicides and bactericides and they have a capacity to take up iodine, thus acting as iodofors and forming complexes which are effective against bacteria even in considerable amounts of organic contaminants. Surprisingly, however, the new compounds are ineffective as wetting agents, whereas the bis(5,5,7,7-tetramethyl-2-octenyl)dialkylammonium salts of my patent, No. 2,706,195, are efficient wetting agents. While the bis-(5,5,7,7-tetramethyl-2-octenyl)dimethylammonium chloride disclosed in my patent, No. 2,706,195, gives a ten-second sinking time in the Draves test at a concentration of 0.098%, the (5,5,7,7-tetramethyl-2-octenyl)trimethyl-ammonium chloride of the present invention takes longer than 300 seconds in the Draves test, even at 1% concentration. On the other hand, while the bis(5,5,7,7-tetramethyl-2-octenyl)dimethylammonium chloride of my patent, No. 2,706,195, is practically effective as an antistatic agent, comparing favorably with commercially available compounds now used for this purpose, the new compounds of the present invention are generally twice to four times as effective in reducing the tendency of hydrophobic materials, especially fabrics, yarns and the like, to develop static charges, as in textile operations. This enhanced antistatic quality combined with the reduction in wetting characteristics provides an improved material adapted to be applied as an antistatic finish for various hydrophobic articles, such as fibers, filaments, yarns and fabrics or other formed masses of nylon, cellulose esters such as cellulose acetate, Dacron (polyethylene terephthalate), and polymers of acrylonitrile including copolymers containing 75% to 95% thereof in the polymer molecule. The ineffective wetting activity of the compounds reduces the tendency for the antistatic finish to be removed from the articles treated thereby.

In the following examples which are illustrative of the present invention, the determination of antistatic quality was made by the Tentative Test Method 76–54 described in the 1955 Technical Manual and Yearbook of The American Association of Textile Chemists & Colorists (vol. 31), page 140. The lower the resistance the more antistatic the fabric:

*Example 1*

226 grams of 5,5,7,7-tetramethyl-2-octenyl chloride (1 mole) was dissolved in 300 ml. of methanol and excess trimethylamine as a gas was bubbled in at a temperature of about 65° C. over a period of 5 hours using a Dry Ice condenser to hold most of the trimethylamine. At the end of this period, most of the amine that was added refluxed in the condenser indicating that the reaction was complete. The crude reaction mixture was extracted three times with heptane and evaporated to dryness. Product amounting to 204 grams was a white solid which dissolved readily in water. Analysis for ionic Cl, theo. for $C_{12}H_{23}N^+(CH_3)_3Cl$, 13.6%; found: 14.0%.

*Example 2*

Several pieces of a nylon fabric were treated to reduce the tendency to develop static charges by passage through several solutions. One of the fabrics was passed through a 1% solution of the bis(5,5,7,7-tetramethyl-2-octenyl)dimethylammonium chloride (Patent No. 2,706,195) and the resistance was determined to be 9.9 log. ohms per square of the fabric. A second fabric of the nylon was passed through a 0.25% solution in water of the (5,5,7,7-tetramethyl-2-octenyl)trimethylammonium chloride and the resistance was found to be 9.6 log. ohms per square. A fabric of nylon passed through a 1% solution of the latter compound was found to have a resistance of 7.7 log. ohms per square.

*Example 3*

(5,5,7,7-tetramethyl-2-octenyl)diethylamine is dissolved in absolute ethanol and ethylene oxide is introduced into the solution under pressure to produce the quaternary ammonium hydroxide which was neutralized with tartaric acid to produce the ($\beta$-hydroxyethyl)diethyl(5,5,7,7-tetramethyl-2-octenyl)ammonium tartrate. A nylon fabric passed through a 0.5% solution of this salt showed a resistance of 9.3 log. ohms per square. When the quaternary ammonium hydroxide was neutralized with hydrochloric acid instead of tartaric acid and a nylon fabric was passed into a 5% solution thereof, the resistance measure was 8.3 log. ohms per square.

*Example 4*

A mixture of 226 grams of 5,5,7,7-tetramethyl-2-octenyl chloride (1 mole) and 1 gram-mole of N-methylmorpholine in ethanol is heated at reflux till alkylation is substantially complete. The ethanol is stripped off leaving methyl-(5,5,7,7-tetramethyl-5-octenyl)morpholinium chloride.

I claim:

1. A composition of matter comprising a compound of Formula I:

I

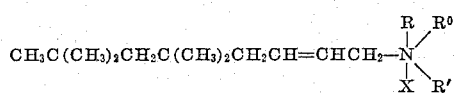

where R, R⁰, and R', when not connected directly to each other, are each selected individually from the group consisting of methyl, ethyl, and $\beta$-hydroxyethyl, R and R⁰, when directly connected together, are selected from the group consisting of —CH₂CH₂OCH₂CH₂—,

—CH₂CH₂SCH₂CH₂—,

—(CH₂)₄— and —(CH₂)₅—, and X is an anion selected from the group consisting of hydroxyl and anions of a water-soluble acid.

2. A composition of matter comprising (5,5,7,7-tetramethyl-2-octenyl)trimethylammonium chloride.

3. A composition of matter comprising ($\beta$-hydroxyethyl)diethyl(5,5,7,7 - tetramethyl - 2 - octenyl)ammonium chloride.

4. A composition of matter comprising ($\beta$-hydroxyethyl)diethyl(5,5,7,7 - tetramethyl -2 - octenyl)ammonium tartrate.

5. A composition of matter comprising ($\beta$-hydroxyethyl)diethyl(5,5,7,7 - tetramethyl - 2 - octenyl)ammonium hydroxide.

References Cited in the file of this patent

UNITED STATES PATENTS

| | | |
|---|---|---|
| 2,191,922 | Bruson | Feb. 27, 1940 |
| 2,286,793 | Dickey | June 16, 1942 |
| 2,432,905 | Kharasch et al. | Dec. 16, 1947 |
| 2,519,924 | Nowak | Aug. 22, 1950 |
| 2,706,195 | Niederhauser | Apr. 12, 1955 |

OTHER REFERENCES

Marszak et al.: Bull. Soc. Chim., France, 1950, pp. 1305–8.

Olomucki: Compt. Rend., 237 (1953), pp. 192–4.